United States Patent [19]
Murphy et al.

[11] 3,825,752
[45] July 23, 1974

[54] LOG-INJECTED-LOG SYSTEM

[75] Inventors: Robert P. Murphy; H. Robert Froning, both of Tulsa, Okla.

[73] Assignee: Amoco Production Company, Tulsa, Okla.

[22] Filed: Aug. 9, 1973

[21] Appl. No.: 387,091

Related U.S. Application Data

[63] Continuation of Ser. No. 212,689, Dec. 27, 1971, abandoned.

[52] U.S. Cl. ............................. 250/258, 250/259
[51] Int. Cl. ............................................ G01t 1/00
[58] Field of Search ............ 250/254, 258, 259, 256

[56] References Cited
UNITED STATES PATENTS

| | | | |
|---|---|---|---|
| 2,480,674 | 8/1949 | Russell | 250/254 |
| 3,562,523 | 2/1971 | Richardson | 250/259 |
| 3,631,245 | 12/1971 | Jorden | 250/259 |
| 3,748,474 | 7/1973 | Murphy | 250/259 |

*Primary Examiner*—Harold A. Dixon
*Attorney, Agent, or Firm*—John D. Gassett; Paul F. Hawley

[57] ABSTRACT

This invention relates to determining the oil saturation in the underground rock reservoir by use of a log-inject-log technique. The formation rock adjacent the well bore is prepared such that the saturation conditions there are representative of those in the interwell area. A thermal decay time log is then run. A chlorinated hydrocarbon oil mixture or blend miscible with the formation oil and having a chlorine content about the same as the formation water is used to displace all the formation oil from adjacent the well bore. A second thermal neutron decay time log is then run. These two logs are then used to determine reservoir characteristics.

5 Claims, 1 Drawing Figure

PATENTED JUL 23 1974   3,825,752
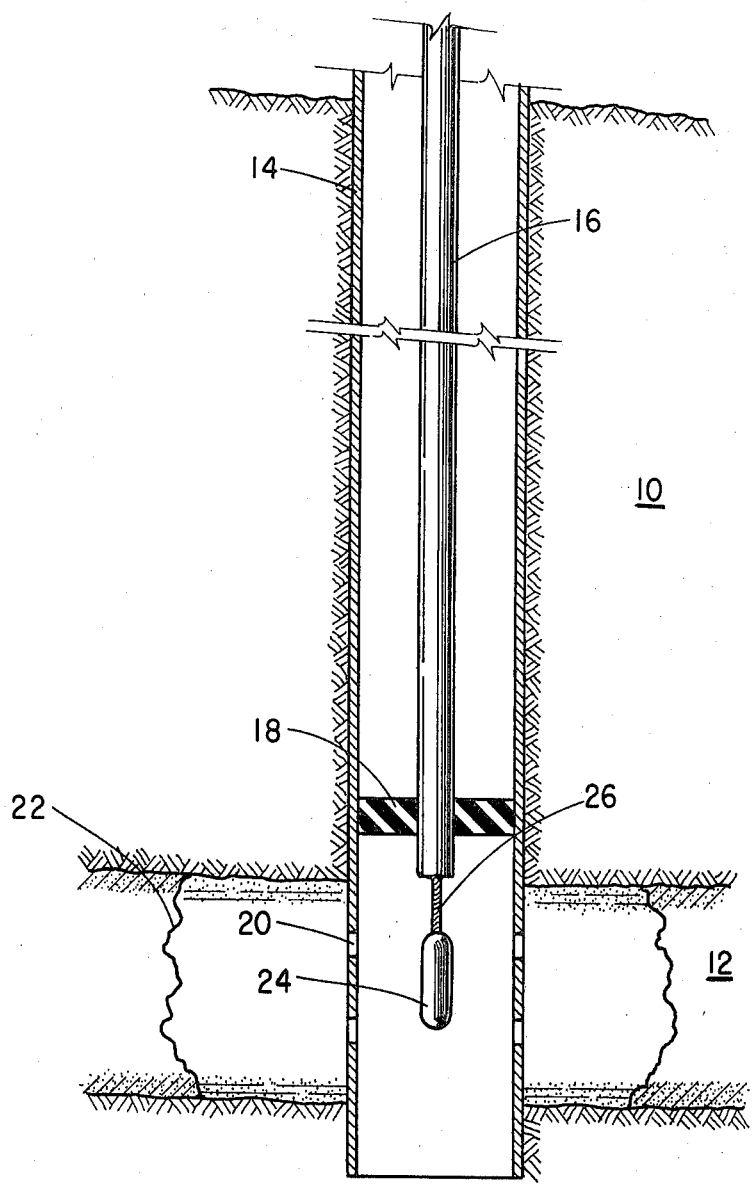

LOG-INJECTED-LOG SYSTEM

This is a continuation of application Ser. No. 212,689, filed Dec. 27, 1971, now abandoned.

RELATED PATENT APPLICATIONS

This application is related to U.S. Patent application Ser. No. 161,342 entitled "Well Logging System" filed July 9, 1971, Robert P. Murphy, William W. Owens and Dwight L. Dauben inventors.

BACKGROUND OF THE INVENTION

Field of the Invention

This invention relates to a method of logging a subsurface formation penetrated by a well bore to determine water saturation and subsequently the oil saturation. It particularly concerns a method which can be characterized as a log-inject-log technique.

SETTING OF THE INVENTION

Conventional Log Analyses

In the planning or engineering of the production of oil from an underground formation, it is most important to know the amount of oil in place. The oil in such underground reservoirs is contained in the pores of the rock. However, these pores contain more than oil. It is known that all such pores contain some water, commonly called connate water. Quite frequently these pores also contain gas.

There are ways of determining the percent of rock volume which is pore space. One such way is to cut a core, which typically is a cylindrical piece of the rock which is two to three inches in diameter and usually 20 to 30 feet at a time. After recovery of the core to the surface, its porosity is determined. However, the knowledge of the porosity of the rock does not give a complete knowledge of the amount of oil in the rock. One must still determine what part of the core pore space is filled with water, what part with oil, and what part with gas. One can measure the quantities of gas, oil, and water in the core that has been brought to the surface and determine the water, oil, and gas saturations in the core. However, experience has shown that the fluid content of the core at the surface is seldom the same as was the fluid content of the core in its natural condition in the reservoir. There are several reasons for this. One is that when any drilling operation takes place in a borehole, and this includes cutting of cores, there is always fluid in the well bore. This fluid is usually what is referred to as a drilling mud. The drilling fluid, whether oil base or water base, usually causes some contamination of the core which is cut by invasion of the core by mud filtrate. If the core is cut using conventional or rubber sleeve core barrels, by the time it reaches the surface, the expansion of gas in the pore space and that which is liberated from oil upon removal of pressure, drives fluid from the core. There have been attempts made to overcome this problem. The most notable example is the use of a pressure core barrel. A pressure core barrel is merely a device inserted in the drill string near the bit. As the core is cut it is received into the core barrel. After the core is cut and is being held in the core barrel, valves are closed so that the core is completely sealed within the barrel. The sealed barrel is then raised to the surface and measurements are then made of the fluid content of the core. This system gives improved results but is quite expensive.

There are no logging devices available that can measure formation of oil saturation directly, by formation oil saturation we mean that percent of the fluid in the pore space of the reservoir rock that is oil. There are devices, however, which can provide a measure of the water saturation. (It should be noted, however, that experience has shown that water saturations can only be computed from these logging devices with an accuracy of ±15 percent). If a gas saturation exists, it can be measured by an independent method such as described in U.S. Pat. No. 3,282,095. The oil saturation can then be computed by a difference of the pore space of the rock not filled with water or gas.

As mentioned above there are various devices available for obtaining a measure of the water saturation. One such method is the running of thermal neutron decay time logs. The equation commonly used for interpretation of these logs is given in equation No. 1 below.

Thermal Decay Time Log $$S_w = \Sigma_t - \Sigma_r / \phi(\Sigma_w - \Sigma_{hc}) + \Sigma_r - \Sigma_{hc}/\Sigma_w - \Sigma_{hc} \qquad (1)$$

where $\Sigma_t$ = thermal neutron capture cross section of formation as measured by log.

$\Sigma_w$ = thermal neutron capture cross section of formation water. Can be predicted from chemical analysis of water.

$\Sigma_r$ = thermal neutron capture cross section of rock matrix. Is assumed from knowledge of lithology.

$\Sigma_{hc}$ = thermal neutron capture cross section of formation hydrocarbons. Estimated from oil gravity and formation pressure and temperature.

$\phi$ = porosity, fraction of bulk volume. Determined from core data and/or porosity logs.

As can be seen from a study of equation (1), a number of different formation parameters must be known quite accurately to provide a reliable measure of the formation water saturations. As mentioned above, experience has shown that water saturations can be computed with an accuracy of only ±15 percent. Usually this is not adequate.

BRIEF DESCRIPTION OF THE INVENTION

This invention relates to determining the oil saturation in an underground rock reservoir by use of a log-inject-log technique. The formation rock adjacent the well bore is prepared such that the saturation conditions there are representative of those in the interwell area. A thermal decay time log is then run. A chlorinated hydrocarbon oil mixture or blend miscible with the formation oil and having a chlorine content about the same as the formation water is used to displace all the formation oil from adjacent the well bore. A second thermal neutron decay time log is then run. These two logs are then used to determine reservoir characteristics. By using the response of the two logs, the formation water saturation at the time the first log was run can be determined without having to know as many variables as when only one log is run. Thus the accuracy is greatly increased.

DETAILED DESCRIPTION OF THE INVENTION

As taught in said U.S. Patent application Ser. No. 161,343 a preferred equation used to calculate the water saturation from the response of the thermal neutron decay time logs is $$S_{w1} = 1 - (\Sigma_2 - \Sigma_1)/\phi (\Sigma_w - \Sigma_{hc})$$

(2)

where
- $S_{w1}$ = formation water saturation of formation prior to injection, fraction of pore space.
- $\Sigma_1$ = thermal neutron capture cross section of formation prior to injection (first log).
- $\Sigma_2$ = thermal neutron capture cross section of formation completely saturated with fluids (water and chlorinated hydrocarbons) of the same and known capture cross section (second log).
- $\Sigma_w$ = thermal neutron capture cross section of formation water or chlorinated hydrocarbon. Can be predicted from chemical analysis of water or knowledge of chlorinated hydrocarbon.
- $\Sigma_{hc}$ = thermal neutron capture cross section of formation hydrocarbons. Estimated from oil gravity and formation pressure and temperature.

This equation (2) eliminates the need to know $\Sigma_r$ required in equation (1).

We simplify the techniques required in obtaining logs represented by $\Sigma_1$ and $\Sigma_2$ for use in equation (2). These techniques can best be explained in step form.

Step I

The initial step is the conditioning of the well to produce as near as possible the same gas, oil, and water saturation adjacent the bore as that present in the rock formation remote from the well bore. All well logging techniques currently known measure physical properties of the rock formations and their fluid contents immediately adjacent the bore. There is some variation in effective depth of investigation, but at best this is only a few feet. On the other hand, it is well known to reservoir engineers that the relative content of gas, oil and formation water a considerable distance from the bore is frequently quite different from that near the bore. There are various reasons for this. For example, high production rates which usually results in a high pressure gradient between the well bore and the inner well area, frequently causes water or gas coning or gas liberation which alters the fluid saturation distribution of the formation near the well bore. As a different example, if a new well is drilled into a partly depleted formation, or if coring is carried out in an oil well, the presence of the drilling fluid may introduce changes in saturations near the bore as compared to deeper in the formation. Thus, for example, if water or oil base mud is used in the drilling or coring, the filtrate will, depending upon the nature of the filtrate, cause too high a water or oil saturation in the core. Thus it is clear that it is desirable before commencing the logging operation to restore the formation as nearly as possible to the steady-state conditions.

In general, we can usually condition the formation adjacent the well bore by controlled production. We produce the well at a very slow rate so as to have a small pressure drop between the well bore and the formation remote from the well. This permits the liquids present in the reservoir formation immediately adjacent the bore to approximate the saturations prevailing a considerable distance from the well bore in the reservoir rock. Thus the relative fluid content of the reservoir rock adjacent the well bore approaches the steady-state condition which exists in most of the reservoir.

One satisfactory initial step in a partly depleted reservoir having a known gas saturation greater than 20 to 30 percent pore space, if economics do not rule it out, is to drill a new well into a reservoir using gas under pressure as a drilling fluid. We have found that under these conditions the liquid saturations in the rock immediately surrounding the well bore are usually very little affected by the drilling operations.

Step I teaches to condition the well to produce as near as possible the same gas, oil, and water saturation adjacent the bore as that present in the rock formation remote from the well bore. This step is essential whether gas saturation exists or not. However, it is to be noted that the overall procedure of this invention is slightly different for those situations where gas saturation exists and those where it does not. In continuing the explanation of our invention and particularly involving Steps II through IV, it will first be assumed that no gas saturation exits in the rock pore space.

Step II — Running a First Log

The next step involves running through the well bore adjacent the rock reservoir of interest a thermal neutron decay time logging device to obtain $\Sigma_1$ which can be defined as a thermal neutron capture cross section of the formation prior to injection.

Step III — Driving All Formation Oil Out of Rock Formation Being Logged

We drive all the formation oil out of the formation immediately adjacent the well bore with a driving fluid that has the following two characteristics. 1) Miscible with the formation oil, and 2) has essentially the same neutron capture cross section as that of the formation water. Very suitable such driving fluids are hydrocarbon-chlorinated hydrocarbon mixtures. Suitable chlorinated hydrocarbons include, chloroform and 1, 2 dichloroethane. In this method we do not have to use a first solvent to drive the oil from the vicinity of the well bore followed by the injection of selected salt water to displace the solvent.

Step IV — Rerun the Log Technique from Step 2

This step is merely the rerun of the identical logging procedure of Step II to obtain $\Sigma_2$.

The values of the log response obtained in Steps II and IV are used in equation (2) to obtain the formation water saturation. If there is no gas present then the oil saturation is merely one minus the water saturation. Each of the logs can be run a number of times and the responses averaged cancelling the effects of any statistical variations in the response which may occur. The average capture cross section is determined for each interval of interest and the oil saturation for that interval is determined. Anyone skilled in the art will have a ready understanding of how to do this. If the reservoir log does contain gas this can be taken into account as described in the said copending application identified in the cross reference above.

Our invention can be used in any logging method in which it is desired to obtain a thermal neutron decay time log in a formation in which all the oil is to be displaced and replaced by a fluid having the same neutron capture cross section as that of the formation water.

Although the above description has been given in considerable detail, it is possible to make modifications in the procedure without departing from the spirit or scope of the invention.

We claim:
1. A method of logging a subsurface zone containing formation oil and formation water penetrated by a wellbore which comprises the steps of:
   a. injecting a driving fluid containing hydrocarbon which is miscible with the formation oil into the zone to displace the formation oil from the vicinity of the wellbore, and which driving fluid has essentially the same neutron capture cross section as that of the formation water,
   b. then running a thermal neutron decay time log immediately following Step (a),
   and then using the logs obtained in Step (b) to determine reservoir characteristics.
2. A method as defined in claim 1 in which the driving fluid is 1, 2 dichloroethane.
3. A method as defined in claim 1 in which the driving fluid includes chloroform.
4. A method as defined in claim 1 which includes prior to Step (a): conditioning of the well so that the fluid content in the zone adjacent the wellbore is approximately the same as that present in the zone remote from the wellbore, and running a thermal neutron decay time log before Step (a).
5. The method of logging a subsurface zone containing formation oil and formation water penetrated by a wellbore which comprises the steps of:
   a. injecting chlorinated hydrocarbon as a driving fluid to displace the formation oil from the vicinity of the wellbore, such chlorinated hydrocarbon having essentially the same neutron capture cross section as that of the formation water,
   b. then running a thermal neutron decay time log immediately following Step (a),
   and then using the log obtained in Step (b) to determine reservoir characteristics.

* * * * *